(No Model.) 2 Sheets—Sheet 1.

R. BUCHANAN.
TIRE.

No. 602,934. Patented Apr. 26, 1898.

Witnesses
C. C. Burdine
D. E. Burdine

Inventor
Robert Buchanan,
by Dodge and Sons
attys

THE NORRIS PETERS CO., PHOTO-LITHO., WASHINGTON, D. C.

(No Model.) 2 Sheets—Sheet 2.

R. BUCHANAN.
TIRE.

No. 602,934. Patented Apr. 26, 1898.

Witnesses
W. C. Burdine
D. E. Burdine

Inventor
Robert Buchanan,
by Dodge and Sons,
Attys

UNITED STATES PATENT OFFICE.

ROBERT BUCHANAN, OF LIVERPOOL, ENGLAND.

TIRE.

SPECIFICATION forming part of Letters Patent No. 602,934, dated April 26, 1898.

Application filed April 12, 1897. Serial No. 631,784. (No model.) Patented in England June 1, 1896, No. 11,901.

*To all whom it may concern:*

Be it known that I, ROBERT BUCHANAN, a subject of the Queen of Great Britain, residing at Liverpool, in the county of Lancaster, England, have invented certain new and useful Improvements in Tires, (for which I have received Letters Patent of Great Britain, No. 11,901, dated June 1, 1896,) of which the following is a specification.

This invention relates to tires for the wheels of road-vehicles, and has for its object a resilient tire which, while having all the advantages of the pneumatic tire, will avoid the defects so objected to in the latter—that they are liable to be punctured by nails, thorns, or any sharp articles met with on the surface of the road.

In carrying my invention into effect I form my tire of a resilient metal tube, either circular, elliptical, or other suitable shape in cross-section and made either of one uniform thickness throughout or rather thinner at the two sides than on the outer and inner peripheries (or vice versa) than at the other parts.

The invention will be understood from the following description, reference being had to the accompanying drawings, in which—

Figure 1:
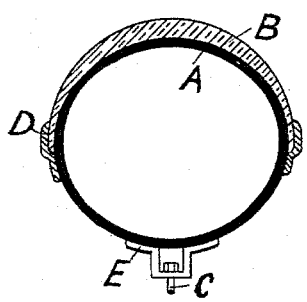
Figure 2:
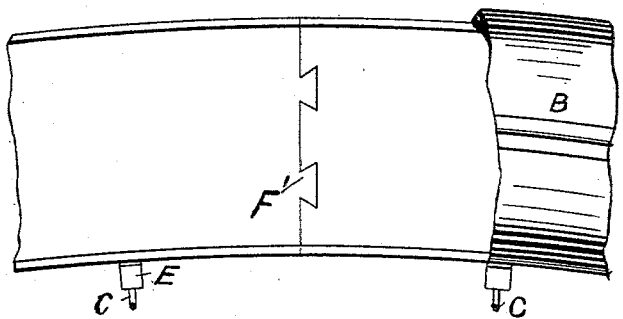
Figure 3:
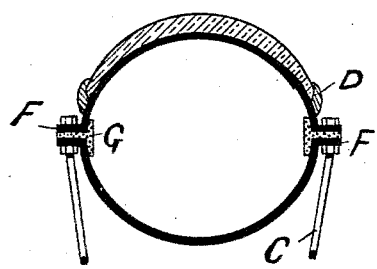
Figure 4:
Figure 5:
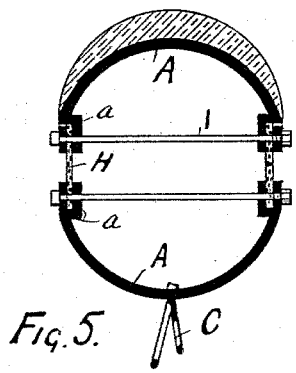
Figure 6:
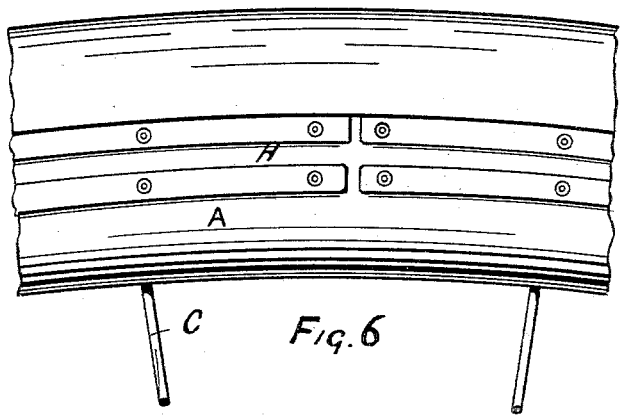
Figure 7:
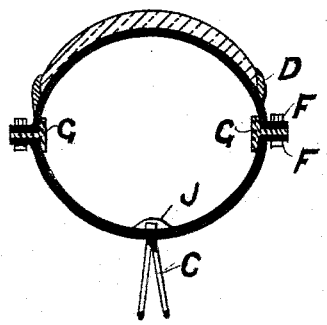
Figure 8:
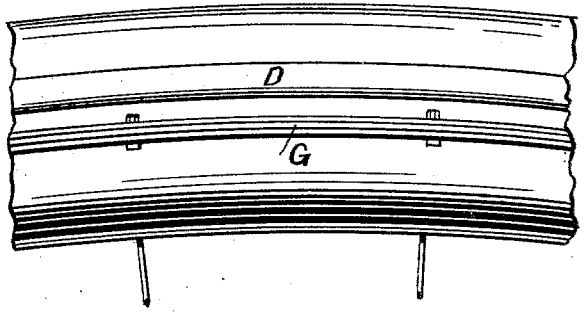
Figure 9:
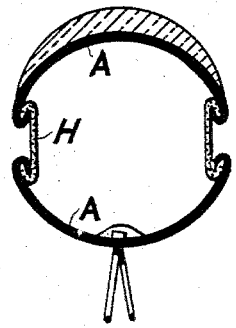
Figure 10:
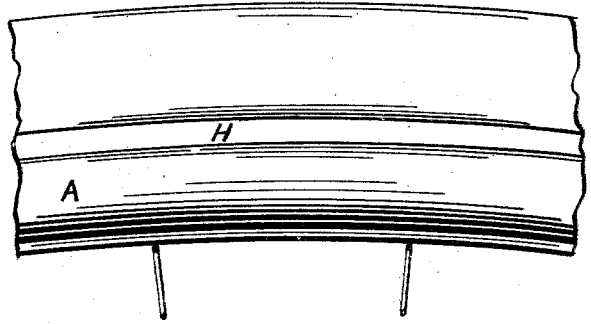

Figure 1 is a cross-section showing a seamless tubular tire constructed in accordance with my invention; Fig. 2, a sectional elevation of a fragment thereof; Fig. 3, a cross-section of my tire formed in two halves and jointed together; Fig. 4, a front elevation; Fig. 5, a cross-section of the tire formed in two halves and jointed together by annular rubber connections; Fig. 6, a fragmentary front elevation; Fig. 7, a cross-section of a tire in which the spokes are connected to the tire direct instead of to the flanges thereof; Fig. 8, a fragmentary front elevation; Figs. 9 and 10, a slight modification of Figs. 5 and 6.

Referring to Figs. 1 and 2, A is the resilient metal tube; B, a tread or cover of rubber or other material; C, the spokes. The tire A is of an elastic imperforate seamless metal tube placed around the rim E and the ends coupled together by means of a sleeve which is passed internally into the ends of the seamless tube A, or the ends may be simply brazed together or fastened together by dovetails J and brazed, or the ends may be simply brazed without dovetailing. The tube A is provided with means for inflating it with air, and the sides of the tube have flanges D for holding the tread B on, or other suitable means are provided for the purpose, or the tread may be fastened in by solution without flanges. The spokes C may be fastened direct to a rim in which the tube A is mounted, which rim may be fixed in sections, or the rim may be dispensed with, in which case brackets E, Figs. 1 and 2, are secured direct to the tire on its inside periphery and the ends of the spokes secured thereto by nuts. In use the tube A, being made resilient, will to a great extent absorb vibration, the tube being compressed vertically by the rider's weight as the tire rotates, while expanding or bulging to a corresponding extent laterally. When the load is removed, it resumes its normal position. It will thus be seen that I not only rely upon the resiliency of the air, but also on the resiliency of the imperforate spring-tube A, the spring of the tube remaining uniform, while the pneumatic resiliency can be altered by varying the inflation. If preferred, the imperforate tube may be used without inflating it, in which case I rely solely on the tube A for the resiliency of the tire.

While I prefer a seamless tube, as above described, I can form the tube in two halves, as set forth in Figs. 3 and 4, jointed together to form an air-tight joint. In this case the halves may be flanged at F and fastened together with an insertion of rubber G between, the spokes C in such case being fastened through the flanges F, or the two halves of the tube may be jointed together by annular rubber connections H, as set forth in Figs. 5 and 6, in which A are the two halves of the tube, having grooves or flanges *a*, receiving the annular rubber pieces H, the rubber being secured to the flanges by the bolts I with washers outside. By this arrangement I utilize the elasticity and air-proof qualities of the rubber as well as the elasticity of the two halves of the tube.

The tire shown in Figs. 7 and 8 is practically identical with the one shown in Figs. 3 and 4, the only difference being that the spokes are attached to the tire direct instead of to the flanges, the points where the spokes are secured to the tire being covered with india-rubber J to form an air-tight covering.

In Figs. 9 and 10 I employ annular flanges H', of rubber, bent over at the edges to form claws, engaging similarly-formed claws at the edges of the tire, this arrangement being a slight modification of the tire shown in Figs. 5 and 6.

I declare that what I claim is—

1. A tire comprising two annular metallic sections substantially semicircular in cross-section, said sections being formed with seats or grooves in their edges; annular rubber sections H extending across from the grooves and fitting therein; and means for securing said sections in place.

2. In a tire formed of a resilient metal tube, the combination therewith of brackets secured at intervals direct to the inside periphery of the tire, the brackets being so arranged as to receive and hold the spokes substantially as described, whereby the use of a wheel-rim is dispensed with.

In testimony whereof I have signed my name to this specification in the presence of two subscribing witnesses.

ROBT. BUCHANAN.

Witnesses:
G. C. DYMOND,
W. H. BEESTON.